Patented July 13, 1937

2,087,089

UNITED STATES PATENT OFFICE 2,087,089

MILK OF MAGNESIA

Ralph E. Hall, Mount Lebanon, Pa., assignor to Hall Laboratories, Inc., Pittsburgh, Pa., a corporation of Pennsylvania No Drawing. Application June 18, 1936, Serial No. 85,940

4 Claims. (Cl. 167—72)

This invention relates generally to milk of magnesia, and more particularly to milk of magnesia having a decreased tendency to coagulate or flocculate upon standing.

Milk of magnesia, upon standing, has a tendency to coagulate or flocculate, forming curds which gum up the container and make it difficult to screw the top onto a bottle containing the product. The magnesia has a tendency to settle and separate from the water, making it necessary to shake the container before the product is poured.

I have found that these disadvantages may be overcome by adding to the milk of magnesia a small amount of an alkali-metal metaphosphate, say, ½% of sodium hexametaphosphate based on the weight of the magnesia. The metaphosphate decreases the viscosity of the milk of magnesia, deflocculating it and maintaining it in a more fluid condition, so that it does not settle as rapidly or become sticky or tend to clog up the neck of the bottle. The material which I prefer to use is the soluble sodium metaphosphate sometimes called "Graham's salt", (Textbook of Inorganic Chemistry, edited by J. Newton Friend, vol. 6, part 2, page 177, by J. B. R. Prideaux, Philadelphia, 1934; Gmelin, Handbuch der Anorganischen Chemie, vol. 21, page 922, 8th edition, Berlin, 1928); or "Graham's metaphosphate" (A Dictionary of Chemistry, by Henry Watts, vol. 4, page 578, New York, 1873; A Treatise on Chemistry, by Roscoe & Schorlemmer, vol. 2, part 1, page 283, New York, 1923), and which may have mixed with it a small amount of sodium pyrophosphate to counteract the slight acidity of the sodium metaphosphate. Graham's metaphosphate or salt is believed to consist principally of sodium hexametaphosphate. The sodium hexametaphosphate is assumed to be a complex of the general formula $Na_2(Na_4P_6O_{18})$, although some authorities believe that salts of the formula $Na_5(NaP_6O_{18})$ and $Na_4(Na_2P_6O_{18})$ may also be present.

While I prefer to use sodium metaphosphate, other alkali-metal metaphosphates may be used, such, for example, as potassium metaphosphate, lithium metaphosphate and ammonium metaphosphate. All of these metaphosphates are preferably used in the soluble form commonly known as hexametaphosphate.

Although I have described by way of example the preferred material and the proportions which I prefer to employ, the invention is not so limited, but may be otherwise embodied within the scope of the following claims.

I claim:

1. Milk of magnesia containing an alkali-metal metaphosphate in amount which is only a small part of that necessary to react with all of the magnesia present.

2. Milk of magnesia containing an alkali-metal hexametaphosphate in amount which is only a small part of that necessary to react with all of the magnesia present.

3. Milk of magnesia containing sodium hexametaphosphate in amount which is only a small part of that necessary to react with all of the magnesia present.

4. Milk of magnesia containing Graham's salt in amount which is only a small part of that necessary to react with all of the magnesia present.

RALPH E. HALL.